E. A. C. FOX.
Smoke and Spark Coveyers for Locomotives.

No. 142,906. Patented September 16, 1873.

WITNESSES

INVENTOR
E. A. C. Fox.
By Hill & Ellsworth,
his Attorneys.

UNITED STATES PATENT OFFICE.

ERNST A. C. FOX, OF FREDERICK CITY, MARYLAND.

IMPROVEMENT IN SMOKE AND SPARK CONVEYERS FOR LOCOMOTIVES.

Specification forming part of Letters Patent No. 142,906, dated September 16, 1873; application filed July 30, 1873.

*To all whom it may concern:*

Be it known that I, ERNST A. C. FOX, of Frederick City, in the county of Frederick and State of Maryland, have invented a new and useful Improvement in Smoke and Spark Conveyer for Locomotives; and I do hereby declare the following to be a full, clear, and exact description of the same, reference being had to the accompanying drawings forming part of this specification, in which—

Figure 1:
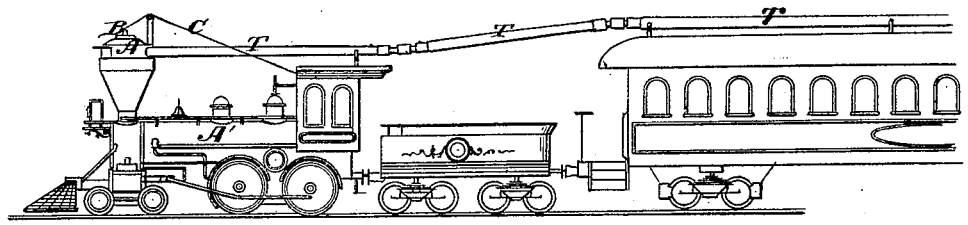
Figure 2:
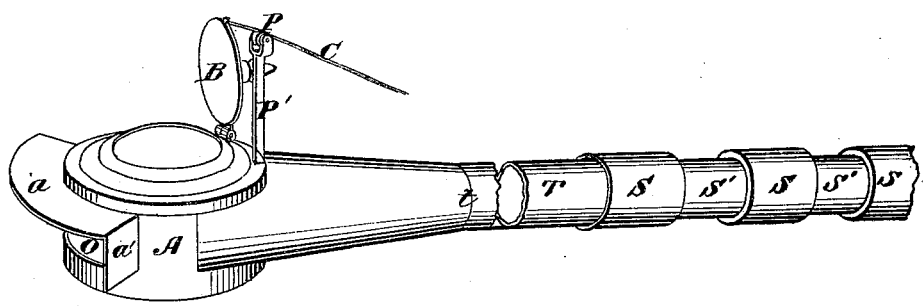
Figure 3:
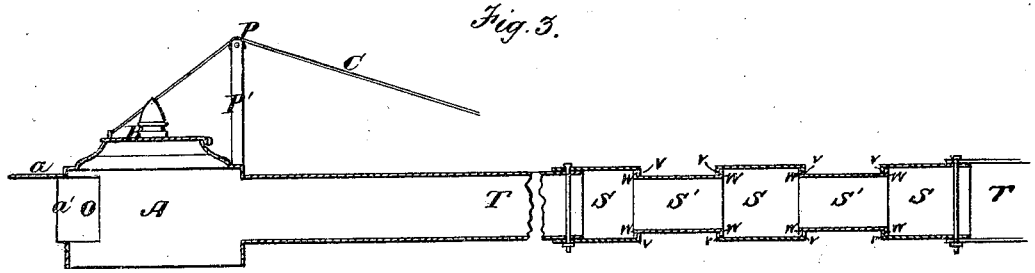
Figure 4:
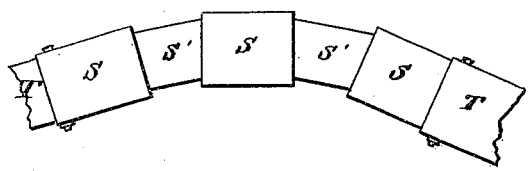
Figure 5:
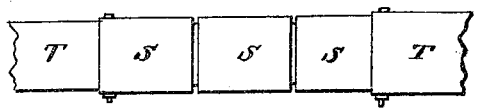

Figure 1 is a side elevation, showing the application of my invention. Fig. 2 is a perspective view. Fig. 3 is a longitudinal section, and Figs. 4 and 5 are views, showing the coupling in different positions.

Similar letters of reference in the accompanying drawings denote the same parts.

This invention relates to that class of smoke-conductors for railroad-trains, in which sections of tubing are used extending from the smoke-stack to the rear end of the train, and conveying the smoke, cinders, &c., away without annoyance or discomfort to the passengers. My invention has for its object to provide for the public an improved apparatus of the class above mentioned; and to this end it consists in the peculiar flexible couplings, by which the lengths of tubing are connected between the cars, as I will now proceed to describe.

In the drawings, A represents a cylindrical cap fitted over the mouth of the smoke-stack of a locomotive-engine, A', and connected to sections of tubing T T extending backward over a train of cars, as shown in Fig. 1, and adapted to convey the smoke, cinders, &c., from the engine to the rear of the train. The cap A has a conical top open at its upper end, and surmounted with a weighted cover, B, hinged at its rear side to the cap, and having a cord or chain, C, extending from its front side over a pulley, P, in a vertical standard, P', to the cab of the engine, as shown. O represents an opening in the front side of the cap A, and $a\ a\ a'$ projecting flanges around the same, the former extending across the top, and the latter flaring outward at its sides and forming an enlarged throat for collecting the air as the engine advances, and increasing the draft through the tubes. The section T immediately connected to the cap A is widened at its front end, as shown in Fig. 2, and contracted to the point $t$, from which it is uniform in size, and is suitably supported upon the cab at its rear end. The remaining sections T are located on the roofs of the cars, between which they are connected by couplings, composed of intermediate short sections S S', of which there are about five in each coupling, the sections S at the ends being bolted, or otherwise detachably connected, to the long sections T, as shown in Fig. 3. The sections S S' are tubular, the sections S being the larger in diameter, and provided with inwardly-turned flanges $r$ at their ends. Said flanges extend around the entire diameter of the sections S, and constitute contracted throats, through which pass the ends of the smaller sections S'. The latter have flanges or stops W, bent outward at their ends by any suitable means, within the sections S, as shown, and the sections S S' being thus securely connected. The flanges or stops W need not extend entirely around the sections S'; but may consist of four or more lugs, projecting outward and preventing the withdrawal of the sections S', the flanges $r$ of the latter fitting sufficiently close around the sections S' to prevent the escape of smoke. The couplings thus constructed are sufficiently flexible to allow a deviation from a straight line in passing curves and coupling cars of different heights, as shown in Figs. 1 and 4, and are adapted to be contracted and extended like a telescope, as shown in Fig. 5. They are much more durable than ordinary flexible couplings, and are readily detached from the tubes T. The flanged opening of the cap A, and enlarged end of the forward section T, create a powerful draft through the entire length of tubing, and keep the same from being obstructed by cinders and dust. When the train is not in motion the hinged cover B is opened by pulling the cord or chain C from the engine-cab, and held open by making fast the chain, the smoke passing out at the top of the cap A. The cover B closes by its own weight when the cord is released.

Having thus described my invention, what I claim as new is—

In an apparatus for conveying smoke, cinders, &c., back from the locomotive smokestack to the rear end of the train, the straight fixed sections of tubing T T in combination with a series of intermediate short sections, S S', having the inward and outward flanges $v$ $w$, arranged and operating substantially as and for the purposes specified.

ERNST A. C. FOX.

Witnesses:
MELVILLE CHURCH,
N. K. ELLSWORTH.